United States Patent
Siripunkaw et al.

(10) Patent No.: US 8,726,306 B2
(45) Date of Patent: May 13, 2014

(54) DEVICE-SPECIFIC PRE-PROVISOINING ACCESS-LIMITING FOR A MODEM AND A CONSUMER PREMISE EQUIPMENT DEVICE

(75) Inventors: Pak Siripunkaw, Sicklerville, NJ (US); Emery J Weber, Denver, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 50 days.

(21) Appl. No.: 13/238,105

(22) Filed: Sep. 21, 2011

(65) Prior Publication Data

US 2012/0017234 A1 Jan. 19, 2012

Related U.S. Application Data

(63) Continuation of application No. 12/974,750, filed on Dec. 21, 2010, now Pat. No. 8,050,194, which is a continuation of application No. 11/603,761, filed on Nov. 22, 2006, now Pat. No. 7,881,225.

(60) Provisional application No. 60/739,472, filed on Nov. 23, 2005, provisional application No. 60/791,803, filed on Apr. 13, 2006.

(51) Int. Cl.
*H04N 7/16* (2011.01)
*H04N 7/173* (2011.01)

(52) U.S. Cl.
USPC .................. 725/25; 725/91; 725/98; 725/100; 725/111

(58) Field of Classification Search
USPC ................................ 725/25, 91, 98, 100, 111
See application file for complete search history.

(56) References Cited

U.S. PATENT DOCUMENTS

| 5,440,632 | A | 8/1995 | Bacon et al. |
|---|---|---|---|
| 5,666,293 | A | 9/1997 | Metz et al. |
| 5,845,077 | A | 12/1998 | Fawcett |
| 6,023,464 | A | 2/2000 | Woundy |
| 6,308,289 | B1 | 10/2001 | Ahrens et al. |
| 6,393,585 | B1 | 5/2002 | Houha et al. |
| 6,501,750 | B1 | 12/2002 | Shaffer et al. |
| 6,529,910 | B1 | 3/2003 | Fleskes |
| 6,553,568 | B1 | 4/2003 | Fijolek et al. |
| 6,560,203 | B1 | 5/2003 | Beser et al. |
| 6,570,855 | B1 | 5/2003 | Kung et al. |
| 6,574,796 | B1 | 6/2003 | Roeck et al. |
| 6,577,642 | B1 | 6/2003 | Fijolek et al. |
| 6,636,485 | B1 | 10/2003 | Fijolek et al. |

(Continued)

OTHER PUBLICATIONS

ISR issued in PCT/US06/45184, mail date Oct. 29, 2007.

(Continued)

*Primary Examiner* — Kieu Oanh T Bui
(74) *Attorney, Agent, or Firm* — Banner & Witcoff, Ltd.

(57) ABSTRACT

A method of initializing, provisioning, and managing a cable modem and a customer premise equipment device includes, prior to receiving the configuration file for the cable modem, providing an equipment identification message containing a description of the customer premise equipment device connected to the cable modem. In the case where the cable modem has yet to be provisioned, the configuration file received from the network server is a particular access-limiting configuration file that is selected from a group of access-limiting configuration files. The selection of the particular access-limiting configuration file is based on the description of the customer premise equipment device in the equipment identification message. This allows different devices to have different network restrictions or different walled gardens.

20 Claims, 2 Drawing Sheets

(56) References Cited

U.S. PATENT DOCUMENTS

| | | |
|---|---|---|
| 6,654,387 B1 | 11/2003 | Beser et al. |
| 6,658,000 B1 | 12/2003 | Raciborski et al. |
| 6,690,655 B1 | 2/2004 | Miner et al. |
| 6,693,878 B1 | 2/2004 | Daruwalla et al. |
| 6,715,075 B1 | 3/2004 | Loukianov |
| 6,751,299 B1 | 6/2004 | Brown et al. |
| 6,768,722 B1 | 7/2004 | Katseff et al. |
| 6,822,955 B1 | 11/2004 | Brothers et al. |
| 6,831,921 B2 | 12/2004 | Higgins |
| 6,836,806 B1 | 12/2004 | Raciborski et al. |
| 6,857,009 B1 | 2/2005 | Ferreria et al. |
| 6,865,613 B1 | 3/2005 | Millet et al. |
| 6,904,460 B1 | 6/2005 | Raciborski et al. |
| 6,917,675 B2 | 7/2005 | Lazarus et al. |
| 6,952,428 B1 | 10/2005 | Necka et al. |
| 7,007,080 B2 | 2/2006 | Wilson |
| 7,035,270 B2 | 4/2006 | Moore, Jr. et al. |
| 7,039,432 B2 | 5/2006 | Strater et al. |
| 7,058,055 B2 | 6/2006 | Mugica et al. |
| 7,065,047 B2 | 6/2006 | Boxall et al. |
| 7,085,814 B1 | 8/2006 | Gandhi et al. |
| 7,120,139 B1 | 10/2006 | Kung et al. |
| 7,127,049 B2 | 10/2006 | Godse et al. |
| 7,213,062 B1 | 5/2007 | Raciborski et al. |
| 7,272,846 B2 | 9/2007 | Williams et al. |
| 7,285,090 B2 | 10/2007 | Stivoric et al. |
| 7,293,078 B2 | 11/2007 | Danforth |
| 7,293,282 B2 | 11/2007 | Danforth et al. |
| 7,308,700 B1 | 12/2007 | Fung et al. |
| 7,334,258 B1 | 2/2008 | Ford et al. |
| 7,337,217 B2 | 2/2008 | Wang |
| 7,356,841 B2 | 4/2008 | Wilson et al. |
| 7,372,809 B2 | 5/2008 | Chen et al. |
| 7,415,603 B2 | 8/2008 | Woundy et al. |
| 7,443,883 B2 | 10/2008 | Seiden |
| 7,496,652 B2 | 2/2009 | Pezzutti |
| 7,502,841 B2 | 3/2009 | Small et al. |
| 7,512,969 B2 | 3/2009 | Gould et al. |
| 7,526,538 B2 | 4/2009 | Wilson |
| 7,539,193 B2 | 5/2009 | Pfeffer et al. |
| 7,568,220 B2 | 7/2009 | Burshan |
| 7,600,003 B1 | 10/2009 | Okmianski et al. |
| 7,609,619 B2 | 10/2009 | Naseh et al. |
| 7,617,517 B2 | 11/2009 | Kay |
| 7,647,617 B2 | 1/2010 | Bartfeld et al. |
| 7,693,171 B2 | 4/2010 | Gould |
| 7,710,865 B2 | 5/2010 | Naseh et al. |
| 7,747,772 B2 | 6/2010 | Raciborski et al. |
| 7,769,886 B2 | 8/2010 | Naseh et al. |
| 7,836,092 B2 | 11/2010 | Alaniz et al. |
| 7,839,870 B2 | 11/2010 | Siripunkaw et al. |
| 7,848,234 B2 | 12/2010 | McKinnon |
| 7,881,225 B2 | 2/2011 | Siripunkaw et al. |
| 8,041,824 B1 | 10/2011 | Maeng |
| 8,042,132 B2 * | 10/2011 | Carney et al. ............. 725/37 |
| 8,050,194 B2 | 11/2011 | Siripunkaw et al. |
| 8,108,911 B2 | 1/2012 | Datla et al. |
| 2001/0038690 A1 | 11/2001 | Palmer et al. |
| 2001/0049732 A1 | 12/2001 | Raciborski et al. |
| 2001/0051980 A1 | 12/2001 | Raciborski et al. |
| 2002/0010865 A1 | 1/2002 | Fulton et al. |
| 2002/0013948 A1 | 1/2002 | Aguayo et al. |
| 2002/0042819 A1 | 4/2002 | Reichert et al. |
| 2002/0061012 A1 | 5/2002 | Thi et al. |
| 2002/0103931 A1 | 8/2002 | Mott |
| 2002/0106017 A1 | 8/2002 | Dombkowski et al. |
| 2002/0116721 A1 | 8/2002 | Dobes et al. |
| 2002/0147819 A1 | 10/2002 | Miyakoshi et al. |
| 2002/0152384 A1 | 10/2002 | Shelest et al. |
| 2003/0014764 A1 | 1/2003 | Saladino et al. |
| 2003/0069965 A1 | 4/2003 | Ma et al. |
| 2003/0106067 A1 | 6/2003 | Hoskins et al. |
| 2003/0200548 A1 | 10/2003 | Baran et al. |
| 2004/0024912 A1 | 2/2004 | Fukao et al. |
| 2004/0037316 A1 | 2/2004 | Choi et al. |
| 2004/0177133 A1 | 9/2004 | Harrison et al. |
| 2004/0179539 A1 | 9/2004 | Takeda et al. |
| 2004/0190699 A1 | 9/2004 | Doherty et al. |
| 2004/0213278 A1 | 10/2004 | Pullen et al. |
| 2004/0226051 A1 * | 11/2004 | Carney et al. ............. 725/135 |
| 2005/0034115 A1 | 2/2005 | Carter et al. |
| 2005/0047442 A1 | 3/2005 | Volpe et al. |
| 2005/0055595 A1 | 3/2005 | Frazer et al. |
| 2005/0060749 A1 | 3/2005 | Hong et al. |
| 2005/0078668 A1 | 4/2005 | Wittenberg et al. |
| 2005/0122976 A1 | 6/2005 | Poli et al. |
| 2005/0123001 A1 | 6/2005 | Craven et al. |
| 2005/0204168 A1 | 9/2005 | Johnston et al. |
| 2005/0246757 A1 | 11/2005 | Relan et al. |
| 2006/0031436 A1 | 2/2006 | Sakata et al. |
| 2006/0031921 A1 | 2/2006 | Danforth et al. |
| 2006/0159100 A1 | 7/2006 | Droms et al. |
| 2006/0173977 A1 | 8/2006 | Ho et al. |
| 2006/0184640 A1 | 8/2006 | Hatch |
| 2006/0206586 A1 | 9/2006 | Ling et al. |
| 2006/0256799 A1 | 11/2006 | Eng |
| 2006/0271772 A1 | 11/2006 | Woundy et al. |
| 2006/0271946 A1 | 11/2006 | Woundy et al. |
| 2006/0285544 A1 | 12/2006 | Taylor et al. |
| 2007/0016762 A1 | 1/2007 | Ho |
| 2007/0130471 A1 | 6/2007 | Walker Pina et al. |
| 2007/0133409 A1 | 6/2007 | McKinnon et al. |
| 2007/0174471 A1 | 7/2007 | Van Rossum |
| 2007/0177526 A1 | 8/2007 | Siripunkaw et al. |
| 2007/0180484 A1 | 8/2007 | Siripunkaw et al. |
| 2007/0183405 A1 | 8/2007 | Bennett |
| 2008/0285544 A1 | 11/2008 | Qiu et al. |
| 2009/0005066 A1 | 1/2009 | Florkey et al. |
| 2009/0063833 A1 | 3/2009 | Ho |
| 2009/0125958 A1 | 5/2009 | Siripunkaw et al. |
| 2009/0238349 A1 | 9/2009 | Pezzutti |
| 2010/0064356 A1 | 3/2010 | Johnston et al. |
| 2011/0026536 A1 | 2/2011 | Siripunkaw et al. |

OTHER PUBLICATIONS

International Preliminary Report on Patentability issued in PCT/US06/45184, mail date May 27, 2008.
ISR issued in PCT/US08/081422, mail date Dec. 23, 2008.
EP Search Report 08 84 6111, dated Feb. 7, 2011.

* cited by examiner

DEVICE-SPECIFIC PRE-PROVISOINING ACCESS-LIMITING FOR A MODEM AND A CONSUMER PREMISE EQUIPMENT DEVICE

RELATED APPLICATION

The present application is a Continuation of co-pending U.S. patent application Ser. No. 12/974,750, filed Dec. 21, 2010, entitled "Customer Premise Equipment Device-Specific Access-Limiting For a Cable Modem and a Customer Premise Equipment Device," which is a Continuation of U.S. Pat. No. 7,881,225, Issue date Feb. 1, 2011 and filed Nov. 22, 2006, entitled "Customer Premise Equipment Device-Specific Access-Limiting For A Cable Modem And A Customer Premise Equipment Device," which claims priority to U.S. Provisional Application No. 60/739,472, filed on Nov. 23, 2005, and U.S. Provisional Application No. 60/791,803, filed Apr. 13, 2006. Each of the above identified applications and/or patents are hereby incorporated by reference in its entirety.

BACKGROUND

1. Field

Features herein relate to a method of initializing, provisioning, and managing a cable modem and a customer premise equipment device. The features further relate to cable modem configuration files, including the use of an access-limiting configuration file in a case where the cable modem has yet to be provisioned. The access-limiting configuration file restricts network access from the cable modem until the cable modem is provisioned.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application, the cable modem can obtain an IP address in an known manner, and customer premise equipment connected to the HFC network through the cable modem may obtain an IP address, for example, by utilizing DHCP.

In an existing method of initializing a cable modem, the cable modem connection to the CMTS is initialized, the cable modem is provided with a network address, and the cable modem receives a cable modem configuration file from a network server. The configuration file contains service provisioning information. In order to configure services, the cable modem passes certain contents of the configuration file to the CMTS, and the CMTS passes certain identifiers back to the cable modem.

Typically, a service provider restricts or limits access to the network by a cable modem until the service provider validates the cable modem through a provisioning process. In one approach, the service provider maintains a list of hardware addresses for validated cable modems. When a cable modem attempts to initialize, if the hardware address is in the list of valid cable modem hardware addresses, the cable modem is allowed normal access to network resources. In the case where a cable modem has yet to be provisioned, a restricted environment may be provided for the cable modem.

One approach to providing this restricted environment, referred to as a walled garden, involves a single, special configuration file provided in all cases where the cable modem has yet to be provisioned. This special configuration file restricts network access from the cable modem. After the cable modem is provisioned, the cable modem would then receive a regular configuration file as opposed to the special configuration file that keeps the cable modem within the walled garden. Although existing methods of initializing cable modems can limit network access for cable modems that have not been validated, a more comprehensive approach is needed as additional products and services are added in a modern HFC network.

For the foregoing reasons, there is a need for a method of initializing, provisioning, and managing a cable modem and a customer premise equipment device in which, in a case where the cable modem has yet to be provisioned, there is greater flexibility in providing restricted access.

SUMMARY OF THE DISCLOSURE

A method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In a case where the cable modem has yet to be provisioned, the configuration file is in access-limiting configuration file. The access-limiting configuration file restricts network access from the cable modem until the cable modem is provisioned. Prior to receiving the configuration file, the cable modem provides an equipment identification message. The equipment identification message contains a description of the customer premise equipment device connected to the cable modem. For example, when the customer premise equipment device is a network addressable set-top box, the equipment identification message describes the customer premise equipment device as the network addressable set-top box.

The configuration file received from the network server, in the case where the cable modem has yet to be provisioned, is a particular access-limiting configuration file that is selected from a group of access-limiting configuration files. The selection of the particular access-limiting configuration file from the group is based on the description of the customer premise equipment device in the equipment identification message.

Different customer premise equipment devices may have corresponding different access-limiting configuration files for use when provisioning has not yet occurred. For example, a subscriber gateway including an embedded set-top box and an embedded cable modem may receive a specific access-limiting configuration file when the cable modem has yet to be provisioned. On the other hand, some other customer premise equipment device may receive a different access-limiting configuration file when its cable modem has yet to be provisioned. In this way, different devices receive corresponding different restrictions to network resources when they are in the unprovisioned state. Put another way, different devices find themselves in different walled gardens.

It is appreciated that the equipment identification message may take any suitable form. As well, any suitable approach may be used to assure that the appropriate configuration file is received from the network server. For example, a trivial file transfer protocol (TFTP) server may serve the configuration files. Earlier in the initialization process, the cable modem is provided with the location of the server and appropriation configuration file to fetch. This appropriate configuration file is determined based on the equipment identification message provided by the cable modem during cable modem initialization.

Additional features may be used as well. In one aspect, the access-limiting configuration file restricts access from the cable modem and directs any network content requests to a provisioning server. In some embodiments, various approaches may be taken to restrict network access, depending on the application. For example, when the network is an Internet protocol (IP) network including Domain Name System (DNS) servers, IP filtering and/or address resolution manipulation may be used to restrict access to the network, that is, to keep the device within its walled garden. For example, IP filtering may assure that only certain resources may be reached. For example, network address resolution manipulation may redirect all network content requests to the provisioning server.

DETAILED DESCRIPTION

Figure 1:
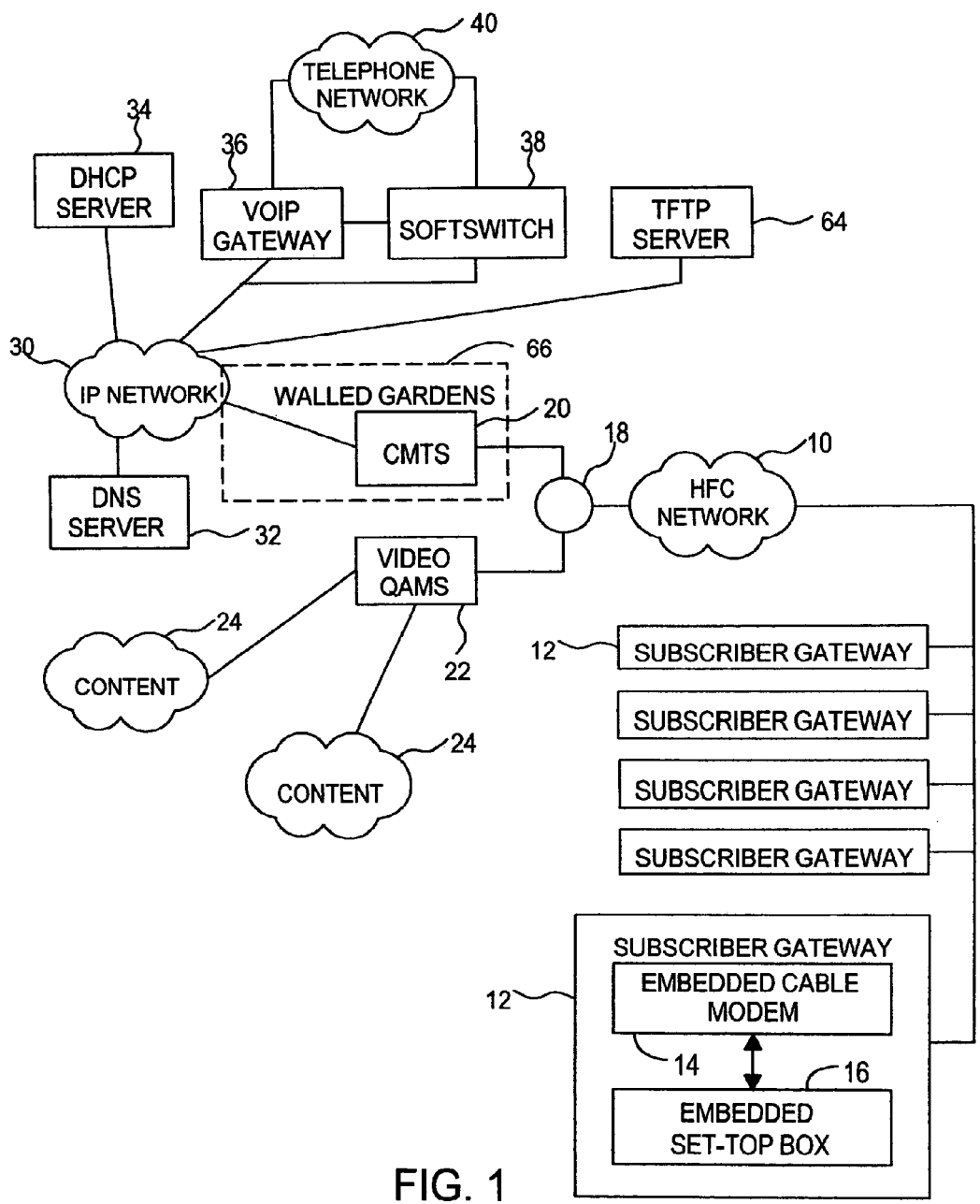
FIG. 1 illustrates a network diagram in accordance with an embodiment described herein.

In FIG. 1, the hybrid fiber coax (HFC) network 10 provides service to a plurality of subscribers. Each subscriber has a subscriber gateway 12. The subscriber gateway 12 is in the form of a next-generation set-top box and includes an embedded cable modem 14 and an embedded set-top box 16. The head end equipment includes cable modem termination system (CMTS) 20 and a plurality of video quadrature amplitude modulation (QAM) systems 22. Connector 18 illustrates the distribution of content from video QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. In FIG. 1, CMTS 20 connects to the provider Internet protocol (IP) network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also, illustrated is trivial file transfer protocol (TFTP) server 64 which serves the configuration files.

Figure 2:
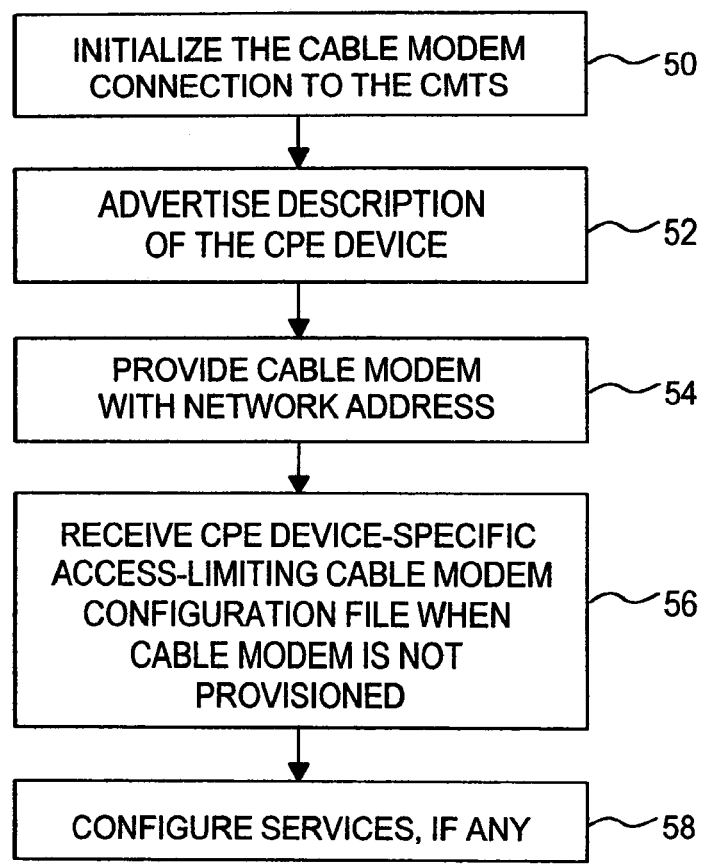
FIG. 2 illustrates initializing, provisioning, and managing a cable modem and a customer premise equipment device in an embodiment herein.

With reference to FIGS. 1 and 2, an example embodiment of initializing, provisioning, and managing a cable modem and a customer premise equipment device is illustrated. The customer premise equipment device is depicted as an embedded set-top box 16, but may take other forms.

At block 50, the cable modem connection to the CMTS 20 is initialized. At block 52, the cable modem 14 advertises the description of the customer premise equipment device 16. This is the providing of the equipment identification message. At block 54, the cable modem 14 is provided with a network address. In more detail, the cable modem 14 is initialized and provisioned using a suitable technique such as known DOCSIS techniques. At block 56, the cable modem 14 receives the cable modem configuration file, for example, from trivial file transfer protocol (TFTP) server 64. Specifically, in the case where the cable modem 14 has yet to be provisioned, a particular access-limiting configuration file that is selected from a group of access-limiting configuration files is received. The selection of the particular access-limiting configuration file from the group is based on the description of the customer premise equipment 16 in the equipment identification message. In this way, different devices may have different restrictions. Put another way, different devices have different walled gardens 66.

For example, one possible implementation is that each kind of CPE device has its own particular access-limiting configuration file that is used when the CPE device's cable modem is not yet provisioned to provide its own particular walled garden. In a straight forward implementation, each device's walled garden 66 contains only network resources related to device provisioning (possibly including self-provisioning). Further, in this example, a set-top box would be in a walled garden designed specifically for set-top boxes, while some other device would be in a walled garden designed specifically for that device. For example, a walled garden for STBs could contain access to certain video servers while some other device has a walled garden that does not include such access. Embodiments include device-specific walled gardens implemented via device specific configuration files that are selected based on an equipment identification message that advertises a description of a connected CPE device.

After the cable modem 14 receives the cable modem configuration file, services are configured. In the case where the cable modem 14 has yet to be provisioned, services, if any, are configured at block 58. At this point, the cable modem 14 has completed initialization, and is a manageable network element in the operator's IP network.

Generally, the initializing and provisioning may take place according to DOCSIS standards or any other suitable approach involving a downloaded configuration file; however, the configuration file sent to the cable modem includes service provisioning information and further, in the case where the cable modem has yet to be provisioned, the configuration file is a particular access-limiting configuration file that is selected from a group of access-limiting configuration files. Put another way, different devices have different walled gardens or different network restrictions. This approach has many advantages. The equipment identification message may be provided in any appropriate way such that the cable modem can be notified of the appropriate configuration file to download from the network server. For example, the cable modem may advertise the description of the CPE device, that is, provide an equipment identification message, during a suitable dynamic configuration technique. A dynamic configuration response may include the name and location of the needed access-limiting configuration file.

It is appreciated that embodiments may involve any suitable underlying initializing and provisioning technique with different devices being provided with different access-limiting configuration files, that is, different devices having different walled gardens. Further, the cable modem and CMTS may take a variety of forms and the type of cable plant is not limited to coax cable or HFC arrangements.

While embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method comprising:
receiving a request for access provisioning from a device in an unprovisioned state on a network managed by a computing apparatus;
identifying a plurality of different pieces of consumer-premise equipment to be serviced by the device; and
transmitting a plurality of device-specific configuration files to the device, each configuration file indicating a different walled garden for a corresponding one of the plurality of different pieces of consumer-premise equipment to be serviced by the device while the device is in the unprovisioned state.

2. The method of claim 1, the transmitting further comprising transmitting different configuration files for different classes of the consumer-premise equipment.

3. The method of claim 1, wherein each different walled garden permits a different level of network access for a different class of the consumer-premise equipment while the device is in the unprovisioned state.

4. The method of claim 3, wherein while the device is in the unprovisioned state, one of the plurality of different walled gardens grants a first class of the consumer-premise equipment limited access to video-computing devices, and another of the plurality of different walled gardens denies a second class of the consumer-premise equipment access to the video-computing devices.

5. The method of claim 1, wherein the device is a cable modem, the method further comprising granting network access to a first consumer-premise equipment of the plurality of different pieces of the consumer-premise equipment, the first consumer-premise equipment serviced by the cable modem before the cable modem is fully provisioned for network access.

6. The method of claim 5, wherein the first consumer-premise equipment is a set-top box.

7. The method of claim 6, wherein the network access granted to the set-top box before the cable modem is fully provisioned includes access to a video-computing device.

8. The method of claim 7, wherein network access granted to non-set top-box consumer-premise equipment to be serviced by the cable modem does not include access to the video-computing device.

9. The method of claim 1, wherein the device and at least one of the consumer-premise equipment are both embedded in a single device.

10. A method comprising:
identifying a plurality of different types of user devices to be serviced by a first computing device;
transmitting a provisioning request to a second computing device, the request identifying the plurality of different types of user devices; and
before receiving full provisioning from the second computing device, receiving, by the first computing device, a plurality of configuration files, each of the plurality of configuration files providing a different walled garden for a corresponding one of the plurality of different types of user devices.

11. The method of claim 10, wherein each of the plurality of configuration files is associated with a plurality of different classes of user devices.

12. The method of claim 10, wherein a plurality of different walled gardens permits a different level of network access for a different class of user device before the first computing device receives full provisioning.

13. The method of claim 12, wherein each of the different walled gardens grants limited access for a first class of user device to video-computing devices, and denies access for a second class of user device to the video-computing devices.

14. The method of claim 10, wherein the first computing device is a cable modem configured to provide network access to a first user device serviced by the cable modem before the cable modem is fully provisioned for network access, first user device being one of the plurality of different types of user devices.

15. The method of claim 14, wherein the first user device is a set-top box.

16. The method of claim 15, wherein the network access provided to the set-top box before the cable modem is fully provisioned includes access to a video-computing device.

17. The method of claim 16, wherein network access provided to non-set top-box consumer-premise equipment to be serviced by the cable modem before the cable modem is fully provisioned does not include access to the video-computing devices.

18. The method of claim 15, wherein the set-top box and cable modem are both embedded in a subscriber-gateway computing device.

19. A method comprising:
identifying, by a first computing device, a plurality of different user devices to be serviced by the first computing device;
transmitting, by the first computing device, a provisioning request to a second computing device, the provisioning request identifying the plurality of different user devices; and
before receiving full provisioning from the second computing device, receiving a plurality of configuration files, each of the plurality of configuration files providing a different walled garden for a corresponding one of the plurality of different user devices.

20. The method of claim 19, further comprising granting, by the second computing device, a different level of network access to each of the plurality of different user devices serviced by the first computing device before the first computing device is fully provisioned.

* * * * *

UNITED STATES PATENT AND TRADEMARK OFFICE
CERTIFICATE OF CORRECTION

PATENT NO. : 8,726,306 B2  
APPLICATION NO. : 13/238105  
DATED : May 13, 2014  
INVENTOR(S) : Pak Siripunkaw et al.

Page 1 of 1

It is certified that error appears in the above-identified patent and that said Letters Patent is hereby corrected as shown below:

Title Page, Column 1, (54) Title, Line 1 and in the Specification, Column 1, Line 1:
   Please delete "PROVISOINING" and insert --PROVISIONING--

In the Claims

Column 6, Claim 14, Line 43:
   In Claim 14, before "first", insert --the--

Column 6, Claim 17, Line 54:
   In Claim 17, delete "devices." and insert --device.--

Signed and Sealed this
Tenth Day of February, 2015

Michelle K. Lee
*Deputy Director of the United States Patent and Trademark Office*